Figure 3:
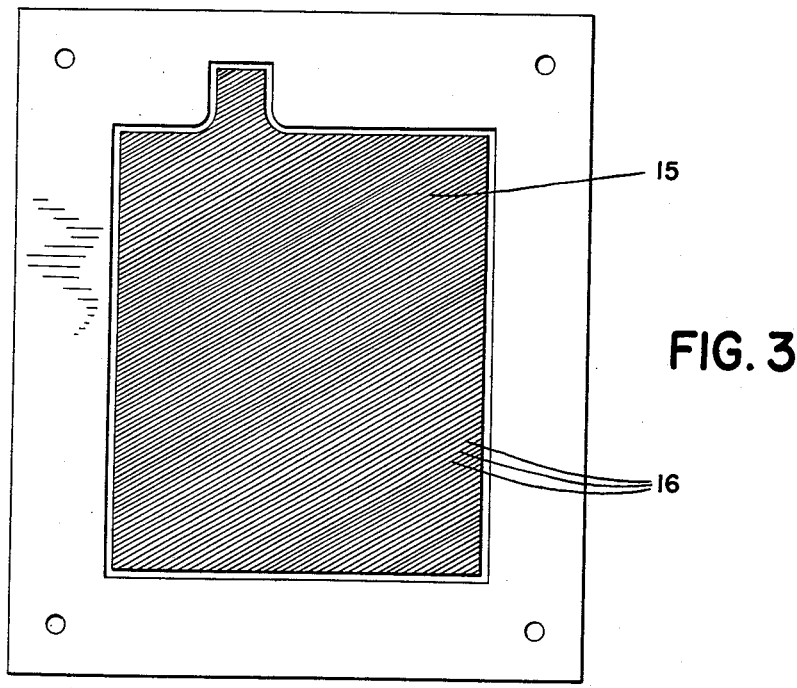

March 19, 1963  E. F. PEVERE ETAL  3,082,281
LEAD STORAGE BATTERY PLATES
Filed June 19, 1959  2 Sheets-Sheet 1
FIG.1
FIG.2
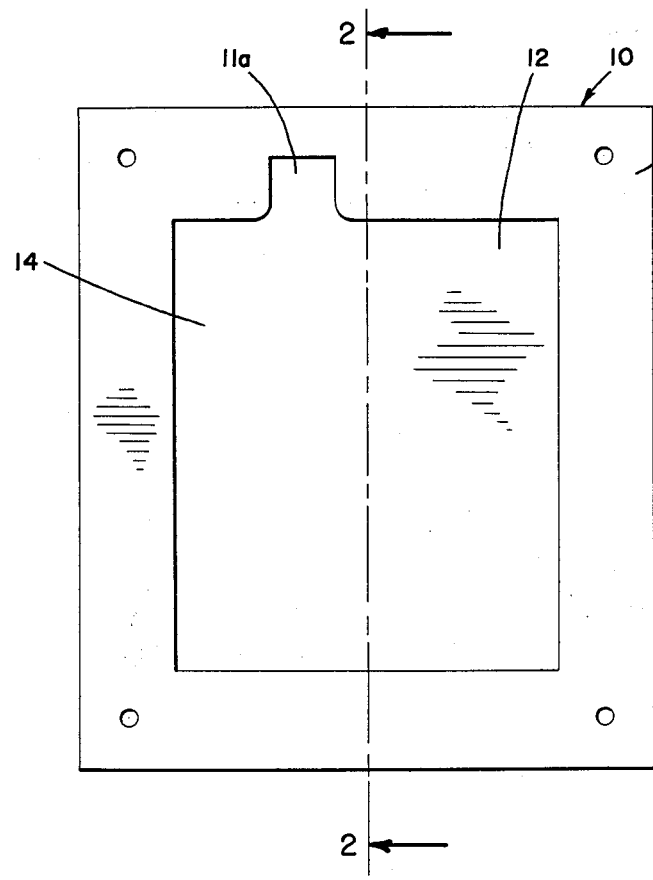
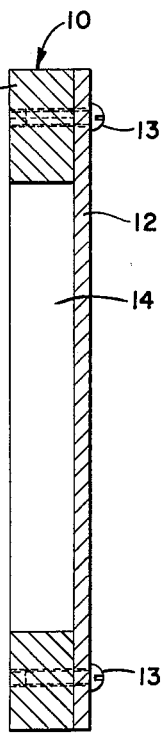

March 19, 1963   E. F. PEVERE ETAL   3,082,281
LEAD STORAGE BATTERY PLATES
Filed June 19, 1959   2 Sheets-Sheet 2

United States Patent Office 3,082,281
Patented Mar. 19, 1963

3,082,281
LEAD STORAGE BATTERY PLATES
Ernest F. Pevere, Beacon, N.Y. (Box 313, West Harwich, Mass.), and James K. Truitt, 158 N. Walnut St., Beacon, N.Y.
Filed June 19, 1959, Ser. No. 821,446
7 Claims. (Cl. 136—75)

This application is a continuation-in-part of our copending application Ser. No. 632,977, filed January 8, 1957 and now abandoned.

This invention relates to lead-acid storage batteries and, more particularly, to an improved method of producing lead storage battery plates or electrodes, and to the unique plates or electrodes produced thereby.

Most commercial lead-acid storage battery plates are currently made by (a) casting or otherwise forming a grid of an antimony-lead alloy to provide strength and hardness, (b) filling this grid with a paste made primarily of high metallic uncalcined lead partially oxidized, or other oxides of lead, and sulphuric acid, and (c) curing and forming the fill in such grid. These plates are electrolytically reduced to serve as negative plates and are electrolytically oxidized to serve as positive plates.

There are substantial disadvantages in making storage battery plates by this process. (A) Such method of manufacture is expensive. (B) Such fill in the grid has a tendency to disintegrate and form a deposit at the bottom of the battery and this in turn to cause a short circuit. (C) There exists the risk that the antimony contained in the grids may form the volatile toxic stibine ($SbH_3$) which might have an adverse effect on health where banks of these batteries are employed in large installations. (D) Further, the antimony contained in the positive plate grids is gradually deposited on the negative plates which in turn causes local action and self discharge and consequently a deterioration in the efficiency of the battery.

Other lead-acid battery plates are made by electrolytic oxidation and reduction of lead requiring repeated charging and discharging in order to build up active lead dioxide and lead respectively. Plates so formed are commonly referred to as Planté plates. A number of different processes are used to provide large areas of exposed lead. There are even greater disadvantages involved in the manufacture of these other lead battery plates than in the case of the grid-filled plates. Thus, they are more expensive to manufacture and have a lower capacity per unit weight, although they do have longer life.

It is an object of the present invention to provide unique lead-acid storage battery plates, and a process for their manufacture, which are superior to and have commercial advantages over commercial battery plates now available. Such superiority and commercial advantages include:

(A) Higher capacity per unit weight and volume.
(B) Longer useful life.
(C) Ability to hold an electrical charge during long periods of shelf life.
(D) Cheaper manufacture.

As one specific illustration of such superiority, the measured time for discharge of plates produced by this invention, as compared with existing commercial plates, is about 1½ times greater for negative plates and about 2 times greater for positive plates.

Figure 4:
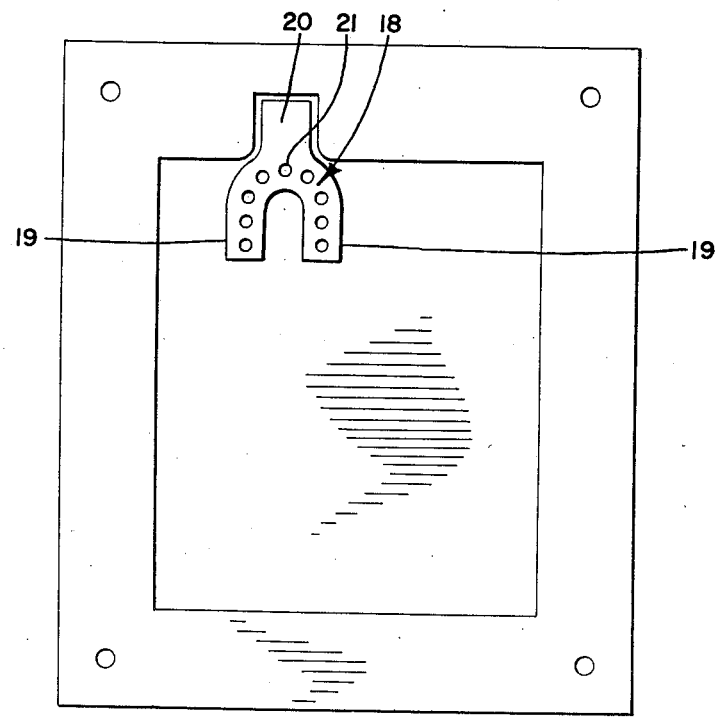

Other objects and advantages will be apparent to those skilled in the art from this description of the invention, taken in conjunction with the accompanying drawings, in which:

FIG. 1 is a plan view of a mold employed in a preferred embodiment of the invention;
FIG. 2 is a side view of the mold of FIG. 1;
FIGS. 3 and 4 are views of FIG. 1 during subsequent stages of the process.

The lead storage battery plates of this invention may be produced very efficiently at low cost. It is not necessary first to prepare a grid as in the case of the present day commercial battery plate; nor is it necessary to employ an antimony-lead alloy. This reduces the health hazard inherent in the use of antimony alloys from which stibine may be produced during use of the batteries. The storage battery plates of this invention have less tendency to disintegrate at the surface than do the present day plates and they are therefore less likely to short out.

In its broader aspects, our invention comprises the formation of a lead storage battery plate by thermally oxidizing a lead-containing blank in the presence of an oxide of nitrogen. The lead-containing blank may take the form of a sheet of lead, preferably perforated, or a porous sheet formed by pressing flat a layer of fine lead wool or wire or their equivalent. Oxygen and oxide of nitrogen oxidize the lead to lead oxide at elevated temperatures.

The oxide of nitrogen may be nitrogen dioxide or its polymers $[(NO_2)_x$, where $x$ is an integer greater than 1]. Other oxides of nitrogen, and particularly higher oxides of nitrogen, i.e. oxides in which the nitrogen has a valence of greater than 1, may be used but under the conditions of our process these are converted to nitrogen dioxide. These oxides of nitrogen may be prepared by any of the well-known methods or purchased. For example, nitrogen dioxide may be prepared by the Ostwald process which comprises oxidizing ammonia to nitrogen dioxide. Nitrogen dioxide may also be produced by the arc process of reacting nitrogen and oxygen gases. We have found that preferred results may be obtained by employing lead nitrate, preferably finely divided, as the source of the oxides of nitrogen. Lead nitrate decomposes thermally to produce lead oxide, nitrogen dioxide and nascent oxygen in accordance with the following equation:

$$Pb(NO_3)_2 \rightarrow 2NO_2 + PbO + O$$

Thus, it seems possible that lead nitrate may provide a source of both nitrogen dioxide and oxygen for the thermal oxidation of the lead blank. However, we do not wish to be bound by any theory by which our processes provide beneficial results. The atmosphere surrounding the lead-containing blank during the oxidation treatment may also contain gases other than the nitrogen dioxide or other oxides of nitrogen, but it will desirably contain some oxygen.

During the oxidation treatment the lead-containing blank is placed in a chamber and the atmosphere in the chamber replaced by the oxidizing atmosphere of nitrogen dioxide and oxygen or air.

During the oxidation treatment the perforated plate is heated to a temperature of between about 300° C. and a temperature which does not unduly deform the plate. In the initial heating stages the temperature should desirably not exceed the melting point of the perforated plate. Pure lead has a melting point of about 327° C. Thus for perforated blanks of pure lead, the initial heating temperature should be maintained at a point not to exceed the value of 327° C. Once a layer of oxidized coating has formed on the surface of the blank of sufficient strength to contain molten lead, the temperature may be raised above the melting point of the lead in order to accelerate the oxidation reaction. However, it is not essential that such high temperatures be employed. The prefererd temperatures of the oxidation treatment are between about 310° and 320° C.

During the oxidation treatment the gaseous atmosphere surrounding the lead containing blank may be subjected to superatmospheric pressures. This has the advantage of accelerating the reaction but has the disadvantage that the resulting oxidized blank may have considerable nitrate present, which is undesirable. However, any excess nitrate may be removed by subsequent treatment. For example, the oxidized blank may be maintained at the operating temperature in an atmosphere free of nitrogen oxides which would result in the thermal decomposition of the lead nitrate, or the oxidized blank may be cooled and treated with an aqueous solution of ammonium hydroxide which reacts with the lead nitrate to form insoluble lead hydroxide and soluble ammonium nitrate which can be removed by water washing. As pointed out hereinabove, it is not necessary to employ pressure and the container need not be sealed, in which event, the process proceeds at atmospheric pressures. Even at atmospheric pressure some nitrate may form on the plates and, if desired, this may be removed in accordance with the above-described procedures.

The thermal oxidation treatment normally requires less than an hour. The time depends primarily upon the thickness of the plate, the source and nature of the oxide of nitrogen atmosphere, and the activity, strength and electrical conductivity desired in the final storage battery plate. It is possible to continue the oxidation treatment until only enough base lead remains for needed strength and electrical conductivity.

At the end of the oxidation treatment of the blank, the final step is the electrolytic reduction or oxidation to form the negative or positive plates, respectively. The oxidized blanks are cooled and immersed in dilute sulfuric acid and alternately connected to the plus and minus terminals of a charging unit for the purpose of accomplishing the reduction and oxidation to form the negative and positive plates. This electrolytic reduction and oxidation may be accomplished by any of the methods with which the art is familiar.

The more specific aspects of our invention may be considered in accordance with two general embodiments. These will be discussed in greater detail hereinbelow.

EMBODIMENT A

In accordance with one embodiment for carrying out our invention, we first produce a lead blank of desired thickness in the shape of a battery plate. Alloys of lead containing small amounts of other metals, such as antimony and calcium, may be employed. However, the use of substantially pure lead is preferred. If desired, the blanks may be in the form of hollow cylinders or other shapes.

The blanks are then punctured or drilled to form fine holes or perforations across the smallest dimension of the blank. Since one of the objectives of making perforations is to increase surface area, it is desirable that the holes be no larger in diameter than the thickness of the blank. They may, of course, desirably be smaller in diameter. The holes may be produced by any suitable means, such as punching, drilling, etc. As a result of perforating the blank, the holes possess collars or rings of metal protruding at the side of the blank opposite from that which the punch or drill enters the blank.

The resulting perforations perform several important functions in the finished plate. They impart additional mechanical strength to the plate which reduces any tendency to alter its shape caused by buckling either during subsequent processing or during service in a storage battery. Also, the holes provide additional surface area to the plate, but we have found that the increase in capacity provided by the holes is far greater than can be attributed to the increase in surface area. Another advantage is that the holes in the plates permit freer diffusion of the acid in which the plates are immersed in the storage battery. This is an important advantage in storage batteries of the high discharge type, for in such batteries the liquid must diffuse and flow rapidly through the plates. As those skilled in the art will recognize, these are advantages which are not attained by present commercial lead storage batteries.

The perforated blanks are next subjected to the thermal surface oxidation treatment by heating the perforated blank in the presence of air or oxygen and nitrogen dioxide or its polymers [$(NO_2)_x$, where $x$ is an integer greater than 1]. These oxides of nitrogen may be prepared by any of the well-known methods including thermal decomposition of lead nitrate, or purchased.

During the thermal oxidation treatment the perforated blank is placed in a chamber and the atmosphere in the chamber replaced by the oxidizing atmosphere of nitrogen dioxide and oxygen or air. Since the plate is heated to a temperature just below its melting point, it is desirably supported on a screened rack which will permit free access of the oxidizing atmosphere to the lead blank. However, it is not necessary to employ a mold or other shape retaining device.

During the oxidation treatment the perforated plate is heated to a temperature of between about 300° C. and a temperature which does not unduly deform the plate. In the initial heating stages the temperature should desirably not exceed the melting point of the perforated plate. Pure lead has a melting point of about 327° C. Thus for perforated blanks of pure lead, the initial heating temperature should be maintained at a point not to exceed the value of 327° C. Once a layer of oxidized coating has formed on the surface of the blank of sufficient strength to contain molten lead, the temperature may be raised above the melting point of the lead in order to accelerate the oxidation reaction. However, it is not essential that such high temperatures be employed. The preferred initial temperatures of the oxidation treatment are between about 310° and 320° C.

During the thermal oxidation treatment, the gaseous atmosphere surrounding the perforated blank may be subjected to superatmospheric pressures. Any excess lead nitrate which may form may be removed by subsequent treatment as described hereinabove. It is not necessary to employ pressure and the container need not be sealed, in which event, the process proceeds at atmospheric pressures. Even at atmospheric pressure some nitrate may form on the plates and, if desired, this may be removed in accordance with the above-described procedures.

The thermal oxidation treatment normally requires less than an hour. The time depends primarily upon the thickness of the plate and the activity, strength and electrical conductivity desired in the final storage battery plate. It is desirable to continue the oxidation treatment until only enough base lead remains for needed strength and electrical conductivity. For thick plates, it may be desirable to oxidize a high percentage of the depth of the lead, whereas with thin plates, it is usually not desirable to oxidize as high a percentage of the lead. The desirable extent of oxidation will depend on the particular utilization which is to be made of the battery. Generally, satisfactory results may be obtained when between about 25% and 90% by weight, and preferably between about 50% and 75%, of the lead has been oxidized.

At the end of the oxidation treatment, the final step is the electroylitic reduction or oxidation to form the negative or positive plates, respectively, which may be carried out as described hereinabove in accordance with any of the methods with which the art is familiar.

EMBODIMENT B

In accordance with the preferred embodiment of our invention, which will be described in specific detail in Example II below and in conjunction with the accompanying drawings, we first prepare a compressed blank or plate of finely-divided lead nitrate and optionally litharge (PbO) with fine lead filaments, such as shredded lead wool or short sections of lead wire or mixtures thereof. The resulting blank construction is heated rapidly to a temperature of about 300° C. and the temperature increased slowly until a temperature of about 310° C. is reached. This rate of heating is desirable to avoid a runaway exothermic reaction which would take place if the precaution were not observed. The temperature is then maintained between about 310° and 320° C. for about one hour. The temperature is not permitted to exceed about 320° C. as higher temperatures cause melting of the lead fibers and cause extrusions of lead even though lead normally does not melt until 327° C. The blank is desirably maintained under pressure during the heating. During the heating the lead nitrate decomposes and may form lead oxide, nitrogen dioxide and nascent oxygen in accordance with the following reaction equation:

$$Pb(NO_3)_2 \rightarrow 2NO_2 + PbO + O$$

The nitrogen dioxide and the nascent oxygen formed may serve to oxidize the lead filaments to convert part of the lead to lead oxide.

At the end of the process contents of the plate are substantially uniformly dispersed throughout as a result of the compression and heat treatment.

It is important that the lead nitrate and litharge be employed in a finely-divided state since the more finely-divided the lead nitrate, the greater is the activity of the final battery plate. We prefer to employ lead nitrate and litharge having a particle size of less than about 40 mesh (U.S. Standard Sieve Series).

The short lead filaments, such as lead wool or blends of lead wool and fine lead wire, may be made of filaments or lengths having various thicknesses, but in the case of lead wool it is desirable to employ lead filaments of between about 3 thousandths and 10 thousandths of an inch thick, desirably averaging about 6 to 10 thousandths of an inch thick.

Various amounts of lead nitrate, optionally litharge, and lead filaments may be employed, depending principally upon the thickness desired in the final battery plate. For a battery plate of about 1/8" thickness, we desire to employ between about 10 and 30% by weight of lead nitrate. Litharge may be employed in amounts of from about 0% to 40% by weight of the plate. The remainder of the battery plate (50 to 90% of the plate) shall desirably comprise the short lead filaments pressed together as outer layers. For thinner plates, it is desirable to employ less of the lead nitrate and litharge and for thicker plates it is desirable to employ greater amounts. For higher capacity plates it is desirable to employ larger amounts of lead nitrate and litharge. Where greater strength is desired, greater amounts of lead filaments are desirable. In accordance with one suitable construction for producing a battery plate about 1/8" thick, we find it desirable to employ the following materials in the listed amounts:

| Material: | Parts by weight |
|---|---|
| Lead wool averaging about 6 to 10 thousandths of an inch thick and being cut into lengths of 1/4 to 3/4 inch long | 75 |
| Lead nitrate of less than about 100 mesh particle size | 18 |
| Very finely-divided litharge powder | 17 |
| | 110 |

In the specific embodiment described in greater detail in Example II below, it is desirable to employ a lead handle or tab weight about 6 parts.

During the thermal oxidation treatment of the battery blank employing the blank of lead wool, lead nitrate and litharge, the lead nitrate decomposes to partially oxidize the finely-divided filaments of lead wool to lead oxide. The particles of lead wool are both oxidized and cold welded together to provide additional strength for the final battery plate.

The thermal oxidation step normally requires less than an hour. The time will depend primarily upon the thickness of the plate and the amount of lead nitrate employed.

After the thermal oxidation treatment, the final step is the electrolytic reduction or oxidation of the oxidized blank to form the negative or positive plates, respectively. These electrolytic treatments may be carried out as described hereinabove in accordance with any of the methods with which the art is familiar.

Using the compressed blank method described above, it is possible to obtain both excellent physical strength in the lead storage battery plate and high capacity and excellent shelf life.

In order more clearly to disclose the nature of the present invention, the following examples illustrate the preparation of typical battery plates. It should be understood, however, that this is done solely by way of example and is intended neither to delineate the scope of the invention nor limit the ambit of the appended claims. All amounts are given in terms of parts by weight unless otherwise stated.

Example I

Sheets of substantially pure lead 1/16 inch thick were cut into blanks 3 x 3.5 inches. These plates were perforated by drilling with a No. 70 drill (.028 inch in diameter) to the extent of about 400 holes per square inch. The perforated blanks were treated in a glass reaction vessel held in a thermostatically controlled muffle furnace. The glass reaction vessel was fitted with an 8 mm. glass tube entering at the bottom which served to convey the reacting gases from the gas holder through the wall of the muffle furnace into the reaction vessel. The blank to be treated was held off the bottom of the reaction vessel about 1½ inches by a layer of glass wool. The top of the reaction vessel was closed by a cover glass. This inhibited the diffusion of the treating gas but did not allow the pressure to build up during the treatment. In this way the atmosphere surrounding the blank was essentially the same as the entering gas stream.

The above described assembly was placed in the muffle furnace held at 320° C. Ten minutes were allowed to bring the reaction vessel and contents to reaction temperature. Then a slow stream of gas, consisting of about equal parts of commercial nitrogen dioxide and air were passed through the reaction vessel for one hour. The reaction vessel was then swept with air, removed from the muffle furnace and cooled. The perforated lead blank was oxidized on both sides, about 60% of the original lead being converted to lead oxide.

Two blanks, so oxidized, with a separator between were placed in an electrolytic cell containing 30% sulfuric acid, by weight. The oxidized blanks were then connected to a source of direct electric current, one blank serving as the positive and the other the negative electrode. Current was passed through the circuit at 4 amps. until a substantial amount of gassing at both electrodes indicated the plates were at full charge. At this stage the oxidized blanks had been converted into positive and negative battery plates; the negative with the characteristic gray spongy lead appearance and the positive the dark brown color of finely-divided lead peroxide. These plates were ready for immediate use in a storage battery.

Example II

This preferred embodiment of the invention will be described in conjunction with the accompanying drawings. This embodiment employs a cavity mold 10 shown in FIGS. 1 and 2, made of steel, comprising a frame 11 having a recess 11a and bottom plate 12 held to the frame by screws 13.

There was first prepared a mixture of 18 parts of lead nitrate of less than 100 mesh (U.S. Standard Sieve Series) size and 17 parts of finely-divided powdered litharge.

Into the bottom of cavity mold 10 having a cavity 14 of 3.5 x 3 inches and 0.5 inch deep was placed a scored iron plate 15 (see FIG. 3) about 1/32" thick and having about the same area dimensions as the cavity 14, so that it could be fitted into the bottom of the mold. The scored plate 15 had scoring 16 of about 1/32" apart and 1/64" deep. The purpose of the scoring was to impart more surface area to the finished battery plate and to provide more compression during molding. Over the scored plate 15 was placed 30 grams of divided lead wool having filaments of about 0.006" to 0.010" thick and about 1/4" to 3/4" long. The lead wool was evenly distributed over the bottom of the cavity of the mold over the scored plate. The lead wool was lightly pressed. Over the lightly pressed lead wool was evenly distributed about 17.5 grams of the mixture of lead nitrate and litharge. Another layer of 30 grams of the same lead wool was then evenly distributed over the layer of mixed lead nitrate and litharge. Inserted about the middle of this thickness of lead wool was a lead tab or handle 18 (see FIG. 4) weighing about six grams and being about 1/64" thick in its two prongs 19 and 1/16" at its handle 20. The prongs 19 contain holes 21 punched alternatively from either side so that burrs remain on either side of the prongs to provide greater adhesion of the lead tab to the lead wool. The tab is positioned as shown in FIG. 4. The remainder of 17.5 grams of the mixture of lead nitrate and litharge was then spread uniformly over the upper surface of the layer of lead wool. After evenly distributing the layer of lead nitrate and litharge over the second layer of lead wool, a top layer of about 15 grams of the same lead wool employed for the other layers was added uniformly over the entire surface of the cavity of the mold. A second scored plate 15 was placed over the top surface of lead wool and over this the mold cover plate (not shown) and the contents of the mold pressed at about 2500 pounds per sq. inch.

With the cover plate held in place, the mold and its contents were heated rapidly to about 300° C. and then slowly to about 310° C. This rate of heating was desirable to avoid an uncontrollable exothermic reaction taking place. The heating was continued for a period of about one hour at between about 310–320° C., the final temperature being about 320° C. Higher temperatures may cause melting of the lead wool filaments and cause extrusion of the lead, even though the melting point of pure lead is about 327° C. After cooling the plate thus formed was removed from the mold. It was about 1/8" thick.

The blank produced was found to be almost homogeneous and uniform in cross section. It is believed that the heat and pressure treatment employed in producing the blank causes the contents of the mold to blend, rather than be retained as separate layers. The lead wool fibers were found to be cold welded to each other in spots and this assists in holding the mixture of lead nitrate and litharge and any of their thermal decomposition products entrapped within small cells between lead wool filaments. The litharge appears to have a cementing action upon the components of the blank and also furnishes some of the active material in the final battery plate. This permits the employment of less lead nitrate. Also, since litharge does not attack chemically the lead wool filaments as much as the lead nitrate, its use provides a physically stronger final plate. This is an important consideration in providing a superior battery plate.

Blanks, so formed, were reduced electrolytically in an electrolytic cell containing sulfuric acid (specific gravity, 1.265) with a direct current of about 5 amps. This produced negative plates. These negative plates ran 40 minutes at 6 amps. discharge to a termination point of 1.5 volts. Positive plates were made from some of the negative plates by electrolytic oxidation at 0.5 amps. current. Cycling (3 cycles) was employed with the discharge rate being at 6 amps. current. Cycling is not always necessary but is desirable, as it is in present day practice for producing commercial battery plates. The finished positive plates had a uniform brown color, with a capacity of 35 minutes at 6 amps. discharge to a termination point of 1.5 volts. A high quality present day commercial positive plate of the same dimensions had discharged to the same termination point in 26 minutes. A five plate cell containing three negative and 2 positive plates produced in accordance with this example had a capacity of 17.6 amp. hrs. compared to 14.0 amp. hrs. for a similar cell made up of a high quality present day commercial plate (both cells tested at a 20 hr. discharge rate which is the standard for rating capacity in the battery industry). A typical plate produced in accordance with this example, when discharged in a battery at a rate of 6 amps. was found to have a capacity of 145% compared with a plate of a high grade commercial lead storage battery having a comparable size and weight.

The terms and expressions employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. A process for producing an improved lead storage battery plate, which comprises compressing into a blank of the dimensions suitable for a lead storage battery plate a mixture of finely-divided lead nitrate and filaments of metallic lead, thermally oxidizing the resulting blank by heating it to a temperature of between about 310° and 320° C., and then cooling the resulting battery plate.

2. A process as defined by claim 1 wherein the filaments of metallic lead are of lead wool.

3. A process as defined by claim 1 wherein the lead nitrate also contains litharge admixed with it.

4. A process as defined by claim 1 wherein the blank comprises between about 10% and 30% by weight of finely-divided lead nitrate, between about 0% and 40% by weight of litharge and finely-divided lead wool comprises the remainder.

5. A process as defined by claim 1 wherein the blank is under pressure during the heating of the blank at a temperature of between about 310° and 320° C.

6. A process as defined by claim 1 wherein the blank comprises a mixture containing the following ingredients in the proportions listed: about 75 parts of finely-divided lead wool, about 18 parts of lead nitrate and about 17 parts of litharge, all parts being expressed in terms of parts by weight.

7. An improved storage battery plate produced by the process which comprises compressing into a blank of the dimensions suitable for a lead storage battery plate a mixture of finely-divided lead nitrate and filaments of metallic lead, thermally oxidizing the resulting blank by heating it to a temperature of between about 310° and 320° C., and then cooling the resulting battery plate.

References Cited in the file of this patent

UNITED STATES PATENTS

| | | |
|---|---|---|
| 316,407 | Shaw | Apr. 21, 1885 |
| 425,999 | Epstein | Apr. 22, 1890 |
| 475,797 | Reckenzaun | May 31, 1892 |

(Other references on following page)

UNITED STATES PATENTS

| | | |
|---|---|---|
| 589,842 | Leitner | Sept. 14, 1897 |
| 633,249 | Rathier | Sept. 19, 1899 |
| 644,050 | Beckmann | Feb. 27, 1900 |
| 704,751 | Martin | July 14, 1902 |
| 903,752 | Morrison | Nov. 10, 1908 |
| 960,115 | Salom | May 31, 1910 |
| 2,139,069 | Cole | Dec. 6, 1938 |
| 2,182,479 | Johnstone | Dec. 5, 1939 |
| 2,517,132 | Piper et al. | Aug. 1, 1950 |
| 2,658,097 | Orsino | Nov. 3, 1953 |
| 2,759,036 | Greenburg et al. | Aug. 14, 1956 |
| 2,837,405 | Herrman | June 3, 1958 |

FOREIGN PATENTS

| | | |
|---|---|---|
| 99,531 | Germany | Sept. 19, 1898 |
| 624,964 | Germany | Feb. 1, 1936 |